US009872342B1

(12) United States Patent
Smith

(10) Patent No.: US 9,872,342 B1
(45) Date of Patent: Jan. 16, 2018

(54) STREET AND GROUND WARMING SYSTEM

(76) Inventor: Jeffrey Smith, Hampton, GA (US)

( * ) Notice: Subject to any disclaimer, the term of this patent is extended or adjusted under 35 U.S.C. 154(b) by 1788 days.

(21) Appl. No.: 13/220,828

(22) Filed: Aug. 30, 2011

(51) Int. Cl.
*H04B 11/00* (2006.01)
*H05B 3/36* (2006.01)

(52) U.S. Cl.
CPC .................................... *H05B 3/36* (2013.01)

(58) Field of Classification Search
CPC ................ H05B 3/36; H05B 2203/003; H05B 2203/005; H05B 2203/011; H05B 2203/017; H05B 2203/026; H05B 2203/033
USPC ........ 219/486, 213, 544, 548–549, 528–529; 237/34, 36, 12; 126/41–42
See application file for complete search history.

(56) References Cited

U.S. PATENT DOCUMENTS

| | | | | |
|---|---|---|---|---|
| 4,646,818 | A | 3/1987 | Ervin, Jr. | |
| 5,233,971 | A | 8/1993 | Hanley | |
| 5,575,109 | A | 11/1996 | Kuntz | |
| 6,987,928 | B2 | 1/2006 | Shields | |
| D542,070 | S | 5/2007 | Richardson | |
| 7,230,213 | B2 | 6/2007 | Naylor | |
| 7,637,053 | B1 | 12/2009 | McAnulty | |
| 2004/0016740 | A1* | 1/2004 | McDonald | 219/213 |
| 2004/0099654 | A1* | 5/2004 | Pais | 219/486 |
| 2005/0254802 | A1* | 11/2005 | Shields | 392/379 |

* cited by examiner

*Primary Examiner* — Phuong Nguyen

(57) ABSTRACT

The street and ground warming system is used to prevent both the surface and sub-surface of a street or ground from freezing. The system includes a box that is partially buried, and atop of said box is provided a solar cell array that generates electricity to power heating elements. The heating elements may extend from the box, and through the sub-surface and emit heat therefrom. The heating elements may stay within said box and coil around rebar that passes there through so as to enable transmission of heat to a sub-surface structure. Alternative powering means may change the location of the solar cells or eliminate the solar cells all together.

3 Claims, 6 Drawing Sheets

STREET AND GROUND WARMING SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of heating and ice prevention, more specifically, a solar powered heating system for use with a street or ground.

B. Discussion of the Prior Art

As will be discussed immediately below, no prior art discloses a street and ground warming system that is installed during construction of a street, which includes at least'an array of solar panels to generate electricity to power heating elements that traverse underneath the street or ground in order to prevent freezing of said surfaces; wherein the warming system includes a box that supports solar cells on a top surface; wherein the box is installed into the ground with the top surface level with surrounding ground or street; wherein the box may include pre-drilled holes along side surfaces that enable rebar to pass there through and in which heating elements coil around said rebar and transmit heat through the rebar to the surrounding sub-surface and surfaces; wherein a temperature sensor and control module monitors sub-surface temperatures and controls the output of the heating elements; and wherein other powering means may be employed to power the heating elements.

The Pais Patent Application Publication (U.S. Pub. No. 2004/0099654) discloses an outdoor heating mat for restricting snow and ice build-up. However, the outdoor heating mat is not a heating system that is built into a street or ground sub-surface, and which prevents the surface and sub-surface from freezing.

The Ervin, Jr. Patent (U.S. Pat. No. 4,646,818) discloses a device for melting snow and ice from outdoor surfaces in which a plurality of mats are provided. Again, the device is a mat that is placed atop a ground or surface and which heats the top surface thereon, and is not a heating system that is partially buried into the ground or is built into a street and which heats both the sub-surface and the surface.

The Naylor Patent (U.S. Pat. No. 7,230,213) discloses a modular heated cover for melting ice and snow. Again, the modular heating cover is not partially buried and/or built into a sub-surface of a ground or street so as to heat both the sub-surface and the surface.

The Shields Patent (U.S. Pat. No. 6,987,928) discloses a recirculated heated air mat system that melts snow and ice from driveways or roofs, preventing its accumulation. However, the mat system is placed atop the ground surface and heats the top surface thereon as opposed to a heating system that heats both the sub-surface as well as the top surface.

The Kuntz Patent (U.S. Pat. No. 5,575,109) discloses a plant protection device that includes a root protection barrier that may be heated. However, the device is directed to protecting the roots and heating a plant, and is not a heating system that prevents freezing of a sub-surface and the top surface of a street or ground.

The McAnulty Patent (U.S. Pat. No. 7,637,053) discloses a crop protection device that is designed to cover a number of citrus fruit trees during periods of cold weather. However, the device is not designed to prevent the ground or top surface of a street from freezing.

The Hanley Patent (U.S. Pat. No. 5,233,971) discloses a solar heated driveway apparatus that comprises a solar collector panel with a conduit to enhance heat flow to assist in melting snow and ice relative to the driveway pad. However, the apparatus does not include a box atop of which is a solar cell array in connection with a heating element that can extend through the sub-surface or wherein the box has holes enabling rebar to traverse through and transmit heat thereto via heating elements located within said box.

The Richardson Patent (U.S. Pat. No. Des. 542,070) illustrates an ornamental design for a snow melting carpet, which doe not depict a box that is partialy buried.

While the above-described devices fulfill their respective and particular objects and requirements, they do not describe a street and ground warming system that is installed during construction of a street, which includes at least an array of solar panels to generate electricity to power heating elements that traverse underneath the street or ground in order to prevent freezing of said surfaces; wherein the warming system includes a box that supports solar cells on a top surface; wherein the box is installed into the ground with the top surface level with surrounding ground or street; wherein the box may include pre-drilled holes along side surfaces that enable rebar to pass there through and in which heating elements coil around said rebar and transmit heat through the rebar to the surrounding sub-surface and surfaces; wherein a temperature sensor and control module monitors sub-surface temperatures and controls the output of the heating elements; and wherein other powering means may be employed to power the heating elements. In this regard, the street and ground warming system departs from the conventional concepts and designs of the prior art.

SUMMARY OF THE INVENTION

The street and ground warming system is used to prevent both the surface and sub-surface of a street or ground from freezing. The system includes a box that is partially buried, and atop of said box is provided a solar cell array that generates electricity to power heating elements. The heating elements may extend from the box, and through the sub-surface and emit heat therefrom. The heating elements may stay within said box and coil around rebar that passes there through so as to enable transmission of heat to a sub-surface structure. Alternative powering means may change the location of the solar cells or eliminate the solar cells all together.

An object of the invention is to provide a heating system that is built into the ground and which heats both the top surface and the sub-surface in order to prevent freezing of either the top surface or the sub-surface.

A further object of the invention is to provide a heating system that relies on renewable resources to generate electricity to power the heating system.

A further object of the invention is to provide a box that is partially buried, but which includes at least one solar cell atop of said box, which is used to generate the electricity required to power the heating system.

A further object of the invention is to include heating elements that either extend away from the box and through the sub-surface or where the heating elements coil around sub-surface structure such as rebar, which can cross through the box via holes located on sides of said box.

These together with additional objects, features and advantages of the street and ground warming system will be readily apparent to those of ordinary skill in the art upon reading the following detailed description of presently preferred, but nonetheless illustrative, embodiments of the street and ground warming system when taken in conjunction with the accompanying drawings.

In this respect, before explaining the current embodiments of the street and ground warming system in detail, it is to be understood that the street and ground warming system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the street and ground warming system.

It is therefore important that the claims be regarded as including such equivalent construction insofar as they do not depart from the spirit and scope of the street and ground warming system. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENT

Figure 1:
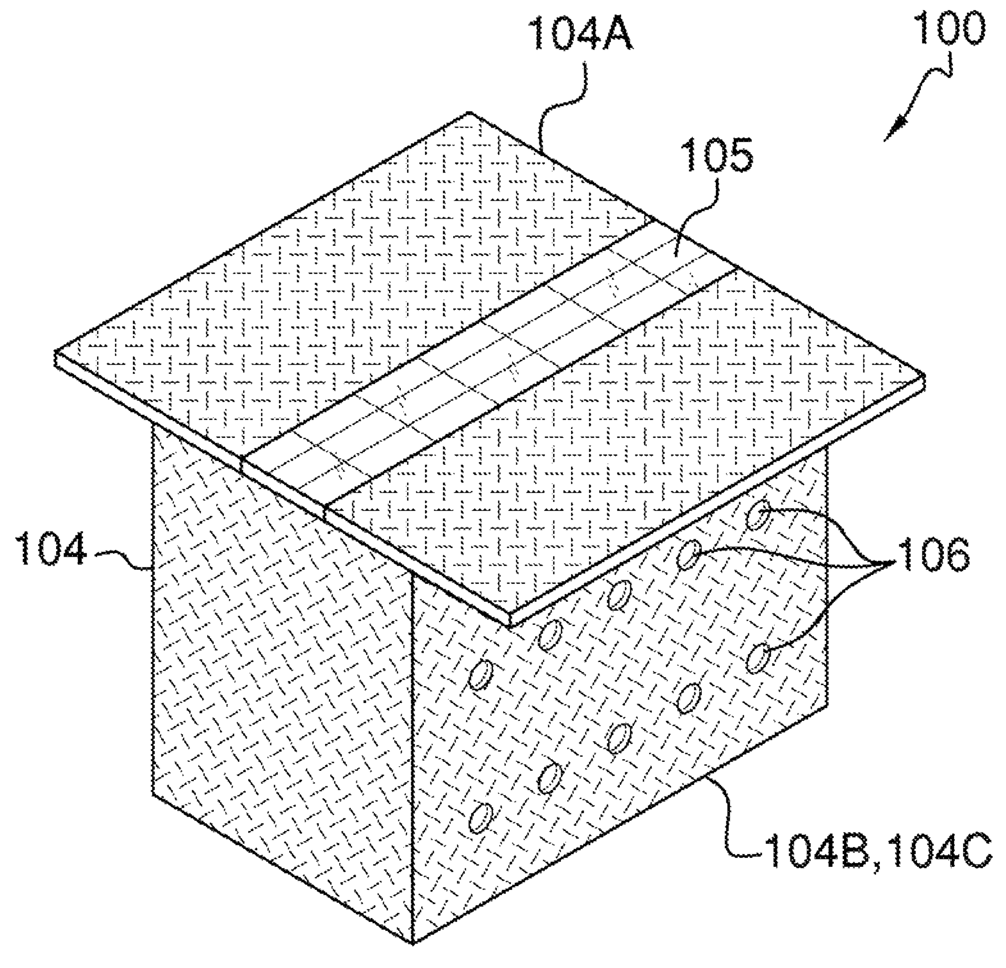
FIG. 1 illustrates a perspective view of the warming system in which the box features holes along side surfaces such that sub-surface structure, such as rebar, may pass through said box.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to the preferred embodiment of the present invention, examples of which are illustrated in FIGS. 1-5. A street and ground warming system 100 (hereinafter invention) includes a heating means 101 that is installed in a sub-surface 130 in order to distribute heat 135 therein for the prevention of freezing therein as well as thereon.

It shall be noted that the term sub-surface 130 is being used to describe anything that is located beneath a top surface 131.

The heating means 101 is comprised of a powering means 102 in wired communication with at least one heating element 103. The powering means 102 is provided in one of many methods comprising solar-power or traditional power sources.

Figure 1A:
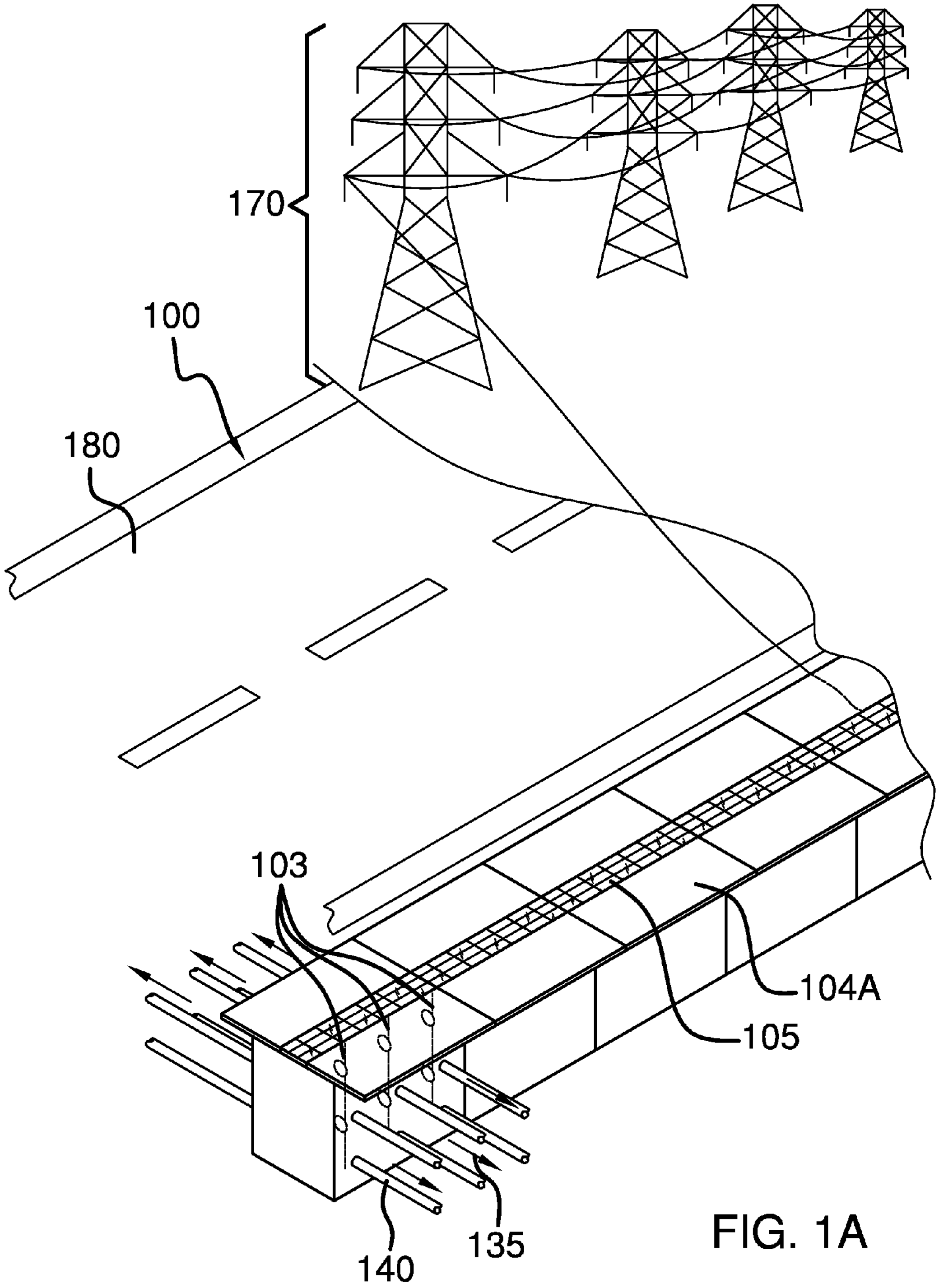
FIG. 1A illustrates a perspective view of a bank of warming systems aligned and powered via power lines.
Figure 2:
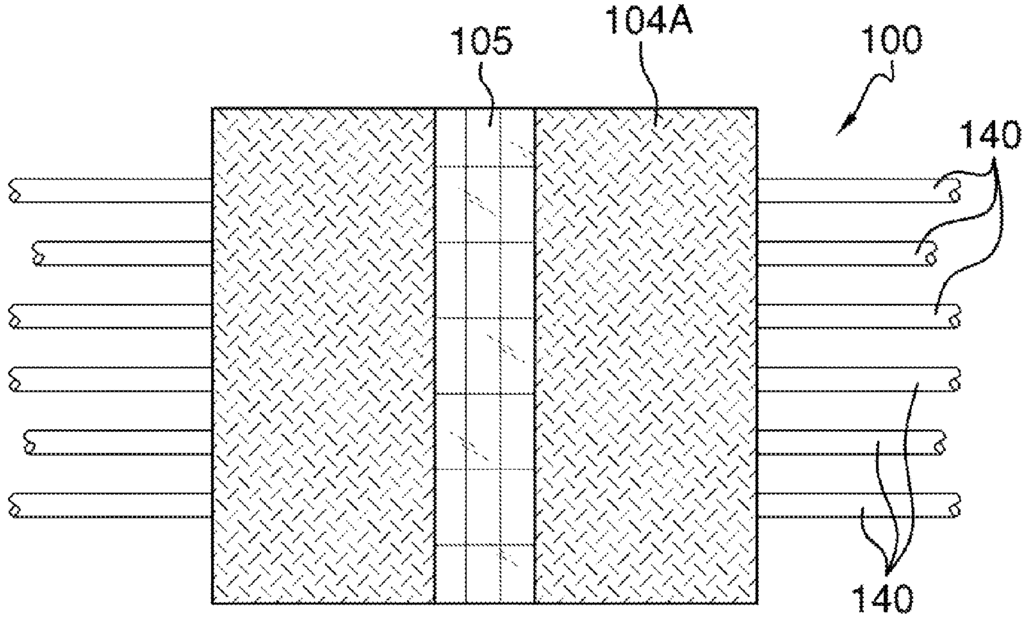
FIG. 2 illustrates a top view of the box wherein rebar is seen extending from opposing sides of the box.
Figure 3:
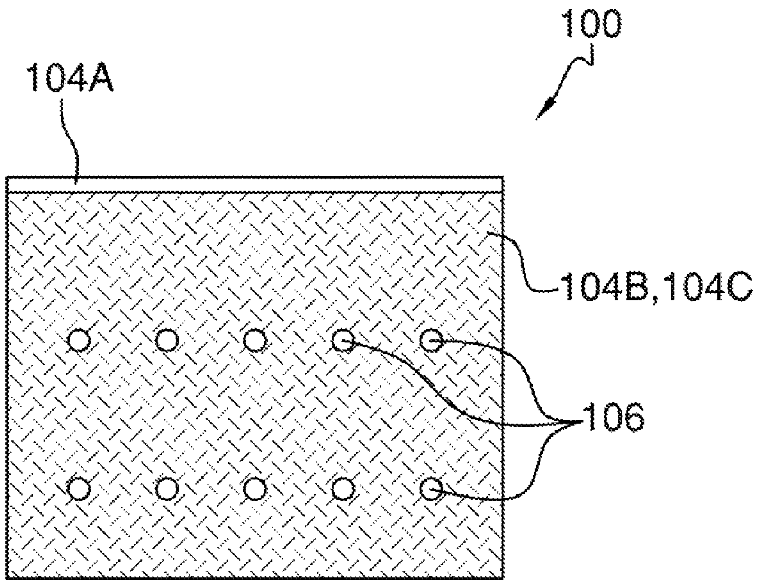
FIG. 3 illustrates a side view of the box detailing an array of holes through which rebar may extend there through in order to distribute heat via the heating elements provided inside of the box.

In a preferred embodiment of the invention 100, a box 104 is provided. The box 104 is further defined by a top box surface 104A, which may be adorned with at least one solar cell 105 thereon. It shall be noted that the solar cell(s) 105 is one of the available powering means 102 that may be incorporated with the invention 100. That being said, the solar cell(s) 105 is used as the powering means 102. The solar cell 105 produces electricity upon receipt of solar energy 160, and transforms said energy into electricity, which is to be used to power the invention 100. However, it shall be noted that the invention 100 may rely upon solar cell(s) 105 that are not located on the box 104. Furthermore, the invention 100 may rely upon electricity that is transmitted from power lines via other power production sources (see FIG. 1A).

The box 104 is further defined by two opposing side surfaces 104B and 104C. Located on both of the opposing side surfaces 104B and 104C are rebar holes 106. The rebar holes 106 form a pattern that is identical and aligned on both of the opposing side surfaces 104B and 104C.

Rebar 140 is well known in the prior art, and is used to strengthen concrete when placed as a lattice prior to pouring said concrete. The rebar 140 is included with the box 104 during the construction of the concrete pad. In using the invention 100, the rebar 140 shall act as the conduit by which heat 150 can be distributed from the invention 100 and out through the surrounding subsurface 130 as well as top surface 131 so as to prevent freezing thereon or therein, respectively.

It shall be noted that the particular design and configuration of the box 104 enables the rebar 140 to pass through the interior of the box 104 where heat is transferred from the heating means 102 to the rebar 140, which transmits heat to the surrounding sub-surface 130 and top surface 131 via conduction.

It shall be noted that the entire premise of the invention 100 is to transmit heat conductively, which will be limited by the particular properties of materials involved in both the sub-surface 130 and the top surface 131.

Figure 4:
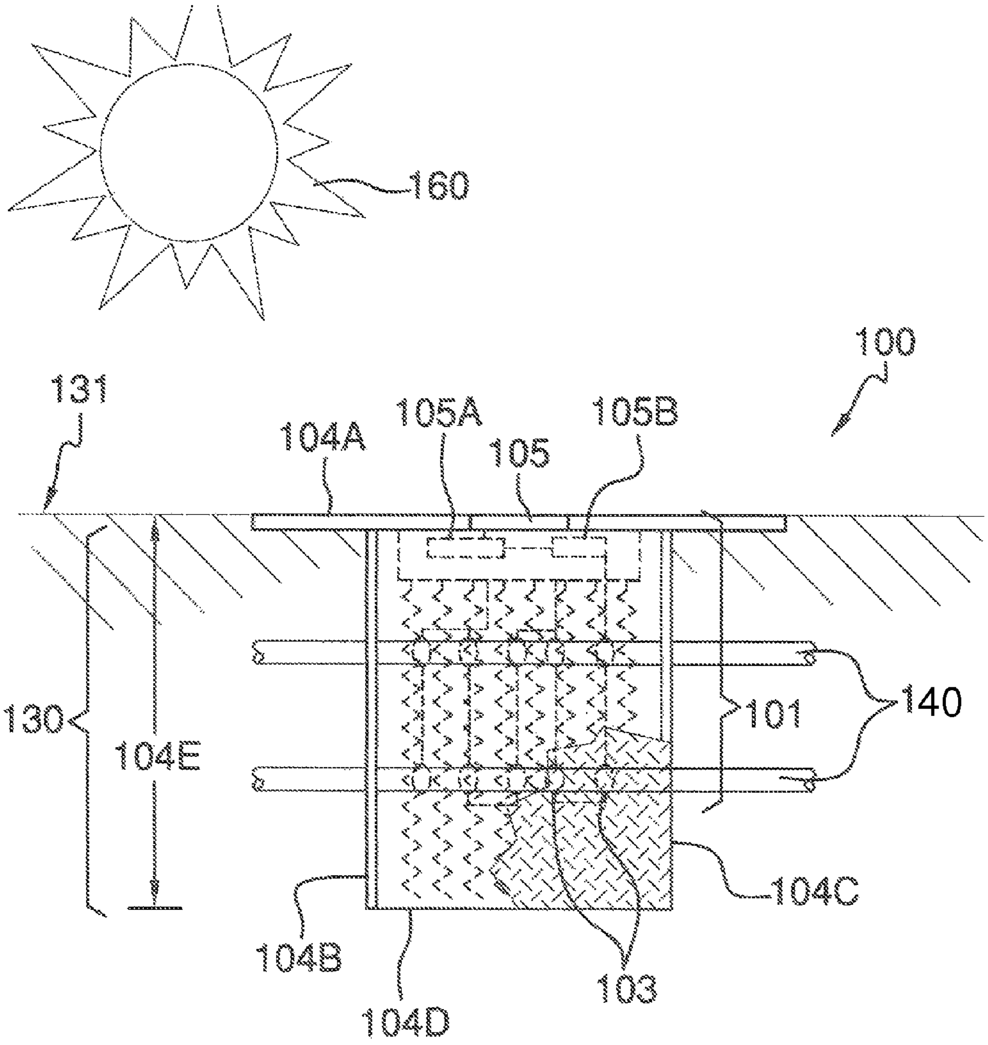
FIG. 4 illustrates a different side view of the box in which a partial cut-away details the interplay between the rebar traversing though the box and the heating elements that coil around portions of said rebar in order to transmit heat.

Referring to FIG. 4, it shall be noted that the heating element 103 is looped around one of the rebars 140 at least one time.

It shall be noted that the construction of the box 104 shall be made of materials suitable for withstanding the forces attributed with being partially buried (see FIG. 4). It shall be further noted that the box 104 shall be buried from a bottom surface 104D up to or less than the top box surface 104A. That being said, the burial depth shall be less than or equal to an overall height 104E of the box 104.

Ideally the powering means 102 will rely upon solar cell technology to deliver the electricity required to adequately heat the heating elements 103 as well as the sub-surface 130 and the top surface 131. It should be noted that the term adequately implies the minimal amount of power needed to prevent freezing of moisture in the sub-surface 130 or on the top surface 130.

Where the invention 100 relies upon the solar cell 105, a power storing means 105A shall be required in order to store electricity until so required by the invention 100. It shall be further delineated that the term power storing means 105 may comprise at least one battery or at least one capacitor. The power storing means 105A shall be in wired communication with the solar cell 105.

It shall be further noted that in order to improve the overall efficiency of the invention 100, regardless of whether solar cells 105 are included or not, a temperature sensing means 105B shall be included and which shall designate when to supply electricity to the heating elements 103. It shall be further noted that the temperature sensing means 105B may include a computing means with predetermined temperature variables that maximize efficiency against time considerations.

The powering means 102 of the invention 100 may rely upon power lines 170 to supply electricity used to operate the invention 100. More the point, the electricity supplied via the power lines 170 may be produced from multiple methods or multiple means of power generation. It shall be noted that the invention 100 may be aligned along a road 180 or pathway.

It shall be noted that where the invention 100 includes the solar cell(s) 105, the invention 100 may be in wired communication with said power lines 170 in order to provide electricity when use of the heating elements 103 is not needed, such as during the day time, or during months of the year that consistently stay above freezing.

Figure 5:
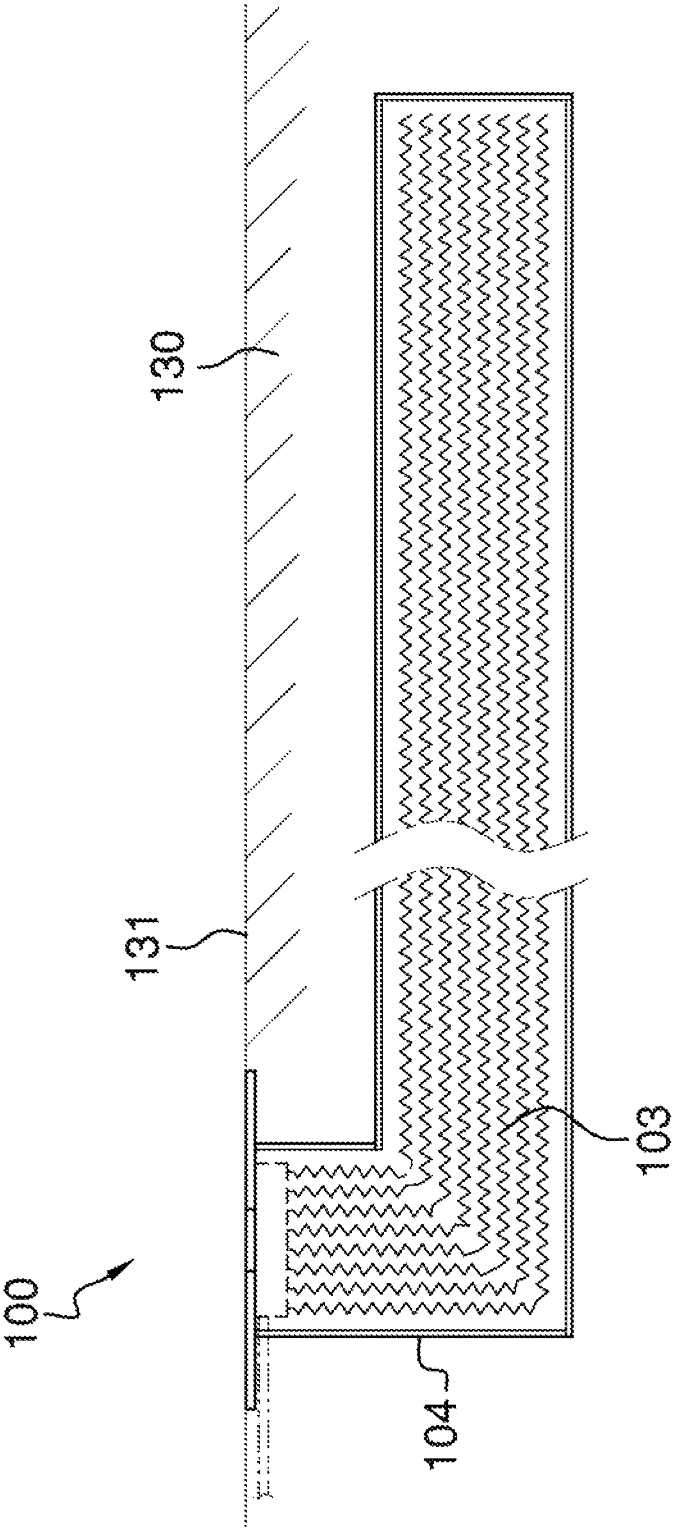
FIG. 5 illustrates a side view of an alternative embodiment of the invention wherein heating elements and box extend through the sub-surface.
Figure 5A:
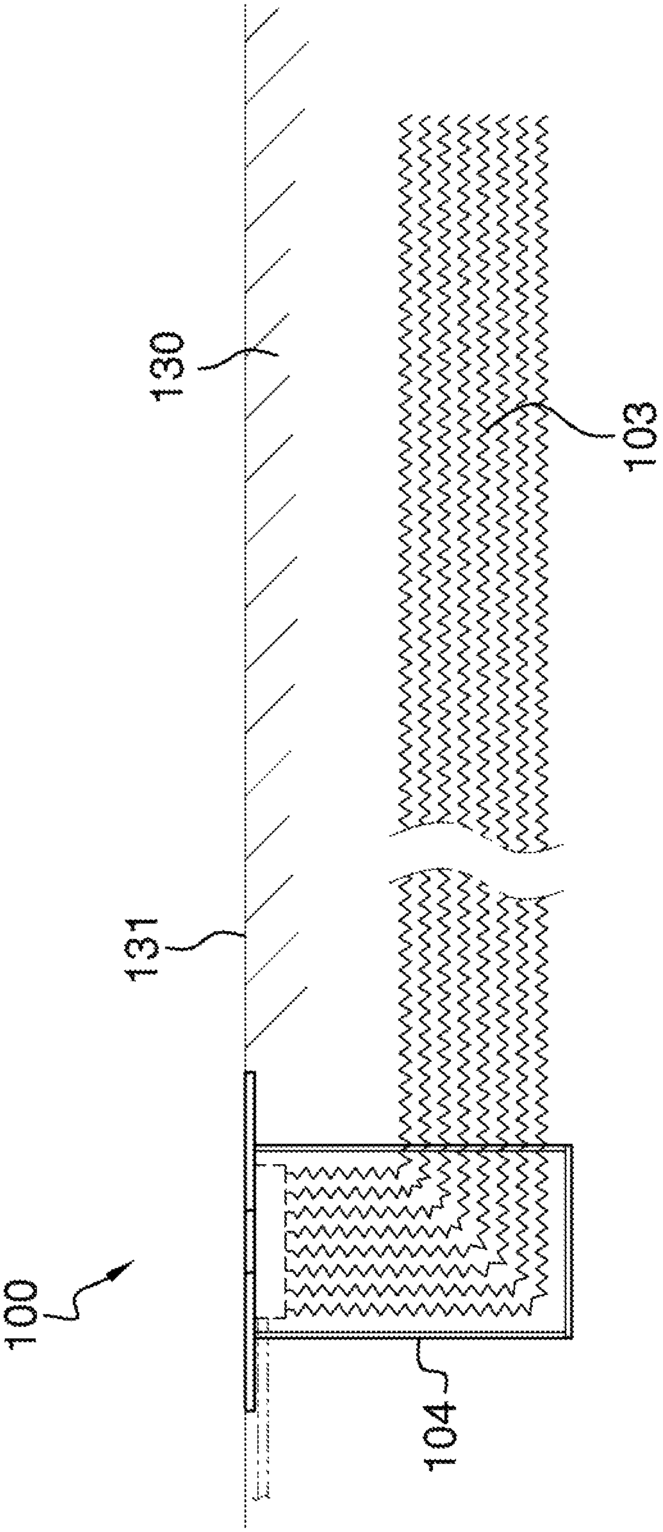
FIG. 5A illustrates a side view of an alternative embodiment of the invention wherein the heating elements extend outside of the box and through the sub-surface.

Referring to FIG. 5, an alternative embodiment of the invention 100 relies upon the heating elements 103 extending laterally within the box 104, which extends throughout the sub-surface 130. It shall be noted that the alternative embodiment shall be incorporate where no other sub-surface structure is available to efficiently distribute heat via the heating means 101. In referring to FIG. 5A, it should be further noted that the heating elements 103 may extend from outside of the box 104 and throughout the sub surface 130.

With respect to the above description, it is to be realized that the optimum dimensional relationship for the various components of the invention 100, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 100.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A street and ground warming system comprising:

a heating means comprised of a powering means in wired communication with at least one heating element that is located in a sub-surface and which can distribute heat there through via conduction;

wherein the heating means includes a box that is defined by a top box surface, and wherein said box is buried at a depth whereby the top box surface is level with said ground;

wherein the powering means comprises at least one solar cell for production of electricity consumed via said heating element;

wherein the solar cell(s) is provided onto the top box surface;

wherein the box is further defined by opposing side surfaces each of which are provided at least one rebar hole in alignment thereon.

2. The street and ground warming system as described in claim 1 wherein said rebar holes enable rebar to pass through an interior of said box in which said heating element or heating elements loop around in order to transmit heat via conductivity; wherein said rebar distributes said heat throughout the sub-surface and to said top surface.

3. A street and ground warming system comprising:

a heating means comprised of a powering means in wired communication with at least one heating element that is located in a sub-surface and which can distribute heat there through via conduction;

wherein the heating means includes a box that is defined by a top box surface, and wherein said box is buried at a depth whereby the top box surface is level with said ground;

wherein the powering means comprises at least one solar cell for production of electricity consumed via said heating element;

wherein the solar cell(s) is provided onto the top box surface;

wherein the box is further defined by opposing side surfaces each of which are provided at least one rebar hole in alignment thereon; wherein said rebar holes enable rebar to pass through an interior of said box in which said heating element or heating elements loop around in order to transmit heat via conductivity;

wherein said rebar distributes said heat throughout the sub-surface and to said top surface.

* * * * *